United States Patent [19]

Krempf et al.

[11] Patent Number: 5,393,508
[45] Date of Patent: Feb. 28, 1995

[54] VAPORIZATION OF SOLUTIONS OF HYDRAZINE HYDRATE

[75] Inventors: Gerard Krempf, Lyons; Bertrand Collier, La Barthe De Neste; Pierre Tellier, Sainte Foy Les Lyons; Jean-Pierre Pleuvry, La Barthe De Neste, all of France

[73] Assignee: Atochem, Puteaux, France

[21] Appl. No.: 118,775

[22] Filed: Sep. 10, 1993

Related U.S. Application Data

[63] Continuation of Ser. No. 621,969, Dec. 4, 1990, abandoned.

[30] Foreign Application Priority Data

Dec. 4, 1989 [FR] France ............... 89 15968

[51] Int. Cl.$^6$ ............................................. C01B 21/16
[52] U.S. Cl. .................................... 423/407; 203/88; 203/91; 203/DIG. 6
[58] Field of Search ................ 423/407, 408; 159/2.1, 159/DIG. 22; 203/88, 91, 29, DIG. 4, DIG. 6, DIG. 25; 202/153

[56] References Cited

U.S. PATENT DOCUMENTS

| | | | |
|---|---|---|---|
| 2,733,195 | 1/1956 | Miller | 203/77 |
| 2,799,631 | 7/1957 | Von Hessert et al. | 202/33 |
| 3,230,158 | 1/1966 | Molique | 202/153 |
| 3,494,737 | 2/1970 | Mundil | 423/407 |
| 4,036,936 | 7/1977 | Yamaguchi et al. | 423/407 |
| 4,724,133 | 2/1988 | Schirmann et al. | 423/407 |
| 4,725,421 | 2/1988 | Schirmann et al. | 423/407 |
| 4,963,232 | 10/1990 | Kuriyama et al. | 203/29 |

FOREIGN PATENT DOCUMENTS

| | | | |
|---|---|---|---|
| 584845 | 10/1959 | Canada | 423/408 |
| 294100 | 12/1988 | European Pat. Off. | 423/408 |
| 1548921 | 12/1968 | France . | |
| 2323635 | 4/1977 | France . | |
| 1058030 | 5/1959 | Germany . | |
| 2536918 | 2/1977 | Germany . | |
| 761018 | 11/1956 | United Kingdom | 423/407 |
| 1207816 | 10/1970 | United Kingdom . | |

OTHER PUBLICATIONS

Grant and Hackh. "Chemical Dictionary", 5th ed. McGraw–Hill: New York (1987), p. 564.
Bueche, F. J. "Introduction to Physics for Scientists and Engineers" 2nd Ed., p. 282.
Kirk–Othmer. "Encyclopedia of Chemical Technology," 3rd Ed. vol. 12, pp. 752-753. Wiley: New York (1980).
Treybal, R. E. "Mass Transfer Operations", 2nd ed. McGraw–Hill: New York (1968), pp. 301-302.
"Evaporation Technology", VCH Verlagsgesellschaft, Weinheim, (1989) pp. 163-165.
"Corrosion–resistant shell and tube exchangers costs compared", Oil and Gas Journal, Jay R. Pudlock, vol. 75, No. 37, (1977) pp. 101-102.
"Tubeside erosion/corrosion in heat exchangers", Heating, Piping and Air Conditioning, vol. 59, No. 12, (1987) pp. 81-82.

Primary Examiner—Gary P. Straub
Assistant Examiner—Peter T. DiMauro
Attorney, Agent, or Firm—Burns, Doane, Swecker & Mathis

[57] ABSTRACT

Solutions of hydrazine hydrate are vaporized, without any concomitant decomposition thereof, by heating such solutions, in the liquid phase, under conditions as to effect the decompression or volatilization thereof; this process is particularly applicable for the vaporization of that hydrazine hydrate solution contained in the reboiler of a column wherein the hydrolysis of an azine $R_1R_2C=N-N=CR_1R_2$ is carried out, with recovery of hydrazine hydrate at the base of the column and of a ketone, $R_1R_2C=O$, at the column head.

16 Claims, 1 Drawing Sheet

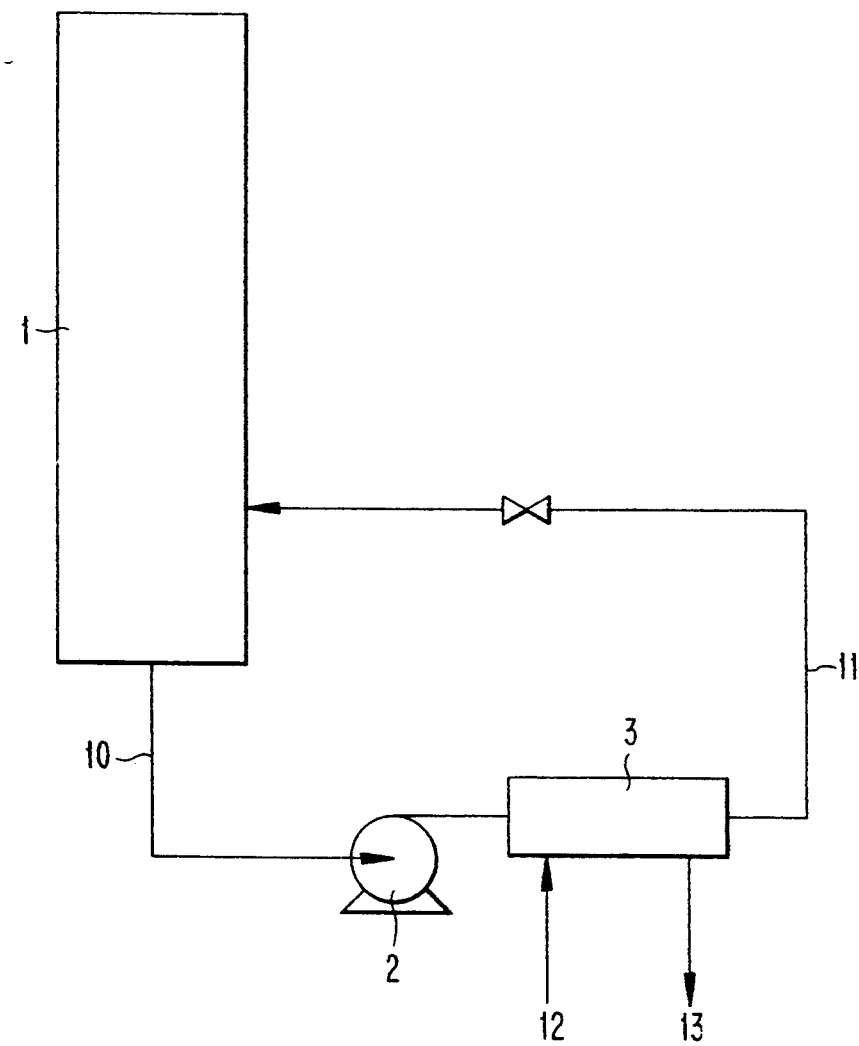

VAPORIZATION OF SOLUTIONS OF HYDRAZINE HYDRATE

This application is a continuation of application Ser. No. 07/621,969, filed Dec. 4, 1990, now abandoned.

BACKGROUND OF THE INVENTION

1. Field of the Invention

The present invention relates to the vaporization of solutions of hydrazine hydrate.

2. Description of the Prior Art

The industrial production of hydrazine hydrate is carried out by the Raschig, Bayer and Atochem processes.

In the Raschig process, ammonia is oxidized with a hypochlorite to provide a dilute solution of hydrazine hydrate which must then be concentrated by distillation.

The Bayer process is a modification of the Raschig process, and entails shifting a chemical equilibrium by trapping, with the aid of acetone, the hydrazine formed in the form of azine $(CH_3)_2C = N - N = C(CH_3)_2$. The azine is next isolated and then hydrolyzed to hydrazine hydrate.

The Atochem process entails oxidizing a mixture of ammonia and a ketone using aqueous hydrogen peroxide in the presence of a catalyst to directly prepare the azine, which is then hydrolyzed into hydrazine hydrate. The Atochem process is described in many patents, for example U.S. Pat. Nos. 3,972,878, 3,972,876, 3,948,902 and 4,093,656.

The hydrolysis of an azine into hydrazine hydrate is described in U.S. Pat. Nos. 4,724,133 and 4,725,421 to Schirmann et al and in GB 1,164,460. This hydrolysis is carried out in a distillation column which is charged with water and with the azine; the ketone is recovered at the head and the hydrazine hydrate at the base of this column. At the base of a hydrolysis column, as at the base of a column for concentrating hydrazine hydrate, there is a device for vaporizing the hydrazine hydrate.

It has been found that decomposition of the hydrazine hydrate is observed when the column is provided with a thermosiphon, a coil immersed at the base of the column or a tube bundle immersed at the base of the column. In general, the vaporization is effected in the reboiler when the hydrazine hydrate contacts the heating surfaces thereof.

SUMMARY OF THE INVENTION

Accordingly, a major object of the present invention is the provision of improved technique for the vaporization of solutions of hydrazine hydrate to avoid the concomitant decomposition thereof, and which improved technique also avoids contacting same with any heat exchanging surfaces.

Briefly, the present invention features vaporizing a hydrazine hydrate solution, comprising heating such solution essentially in liquid phase and then decompressing this solution.

BRIEF DESCRIPTION OF THE DRAWING

The Figure of Drawing is a schematic/diagrammatic illustration of one embodiment of appropriate apparatus/process according to the present invention.

DETAILED DESCRIPTION OF THE PREFERRED EMBODIMENTS OF THE INVENTION

More particularly according to the present invention, the hydrazine hydrate solution is advantageously a solution of water and hydrazine in proportions between highly water-diluted hydrazine (or the hydrate) and hydrazine hydrate. The hydrazine hydrate solution may be a solution which also contains an azine, a hydrazone or ketones. Such solution may also be aqueous or anhydrous.

By the terms "azine" and "hydrazone" are intended, respectively, the compounds of the formulae:

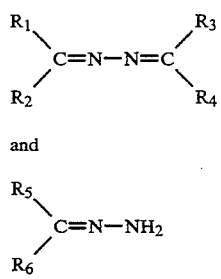

and in which $R_1$ and $R_6$, which may be identical or different, are each hydrogen, or a linear alkyl radical having from 1 to 12 carbon atoms, a cycloalkyl or branched chain alkyl radical having from 3 to 12 carbon atoms, or an aryl radical having from 6 to 12 carbon atoms. The radicals $R_1$ to $R_6$, which are bonded to the same carbon atom of the azine or of the hydrazone may together form a linear or branched chain alkylene radical having from 3 to 12 carbon atoms.

All of the above radicals $R_1$ to $R_6$ may also be substituted by a chlorine, a bromine, a fluorine or a nitro, hydroxyl or alkoxy group, or an ester functional group.

This invention is particularly applicable to acetone azine:

$$CH_3(CH_3)C = N - N = C(CH_3)CH_3,$$

methyl ethyl ketazine 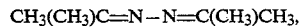 $C_2H_5(CH_3)C = N - N = C(CH_3)C_2H_5$, and the corresponding hydrazones thereof.

To heat this solution essentially in liquid phase, it suffices to pressurize the liquid phase while it is being heated, i.e., the hydrazine hydrate solution absorbs heat energy in the form of an increase in its temperature and then this solution is decompressed and the above energy is restored in the form of a vaporization.

It is also within the ambit of this invention that a portion of the heat energy be consumed by a hydrolysis reaction of an azine and/or of a hydrazone into a corresponding hydrazine or hydrazone.

It is also within the ambit of this invention that, if during the heating of the hydrazine hydrate solution, a fraction thereof be vaporized, such fraction constitutes up to 3% to 5% by weight of the solution which is heated and then decompressed.

The Figure of Drawing illustrates a preferred embodiment of the invention.

There is provided a process for the production of a concentrated solution of hydrazine hydrate by hydrolyzing an azine solution of hydrazine hydrate. The process includes, an a loop external to the distillation column, vaporizing a solution of hydrazine hydrate withdrawn from the distillation column, without concomitant decomposition thereof, by (a) heating the solution in the loop to an elevated temperature, while maintaining same in the liquid phase, then (b) decompressing such heated solution as to volatilize same, and (c) recycling the remaining solution of hydrazine hydrate to the distillation column.

In FIG. 1, 1 is a distillation column, 2 a pump and 3 a heat exchanger. The hydrazine hydrate solution exiting the base of the column 1 is transported via the conduit 10, by means of the pump 2, through the exchanger 3 and then is recycled to the column via the conduit 11. For purposes of simplification, the withdrawal at the base of the column 1, which may be, for example, into the inlet of pump 2, has not been shown. The pump 2 makes it possible to apply to the hydrazine hydrate solution a pressure which is higher than that at the base of the column 1, enabling it to be transported through the exchanger 3 and the conduit 11. This pressure makes it possible to maintain the solution in essentially liquid phase in the exchanger 3. The exchanger 3 is charged via line 12 with steam or a heat-transfer fluid, which is removed via outlet 13. A device or means for producing a pressure drop, such as a valve or a diaphragm, may be arranged at any point along the recycle conduit 11. One skilled in this art can easily determine whether or not to dispose pressure decrease means along the recycle as a function of the pressure decreases generated by the exchanger 3 and the conduit 11. The relative pressure provided by the pump, namely, the pressure difference between the pump output and the base of the column may be of any magnitude, but is usually higher than 0.5 bars and preferably ranges from 1 to 10 bars.

It is also within the ambit of this invention to arrange the exchanger 3 and the pump 2 well below the bottom level of the column 1. This generates an additional pressure on the hydrazine hydrate solution in the exchanger 3. Also, in this particular embodiment of the invention, the pump 2 could be eliminated if the difference in level is sufficient to maintain the solution in liquid phase in the exchanger 3. This embodiment is of interest only if the column 1 is at a sufficient height above ground.

The column 1 may also be a simple storage vessel in which a reaction requiring a vaporization is carried out and which would be provided with a feed inlet and optionally with an overhead offtake with or without reflux, this column 1 being optionally incorporated into a process. It is, for example, a storage vessel in which an endothermic reaction is carried out.

The present invention is of particular value for vaporizing aqueous hydrazine hydrate solutions at temperatures above 100° C., and preferably ranging from 130° to 220° C. The invention is thus particularly useful in respect of the boiler at the base of a column for hydrolysis of azine or of hydrazone into hydrazine.

The present invention also relates to the use of particular materials for fabricating the surface of a device for vaporizing a hydrazine hydrate solution.

Thus, it has now unexpectedly been found that the decomposition of hydrazine varies according to the material constituting the surface for the transfer of the vaporization energy, and that this phenomenon was equally valid (i) in the event of a vaporization entailing heating the hydrazine hydrate solution essentially in liquid phase and then decompressing this solution and (ii) in the event of a conventional vaporization in a boiler utilizing a thermosiphon, an immersed coil, or, in general, any means by which the vaporization is effected by contact with a heat exchanging surface.

It has thus now been determined that titanium, chromium oxides, aluminum, ordinary steel, 304 stainless steel, 316 stainless steel, nickel and its alloys, and zirconium can be classified in this order, titanium resulting in less decomposition than zirconium. 304 and 316 stainless steels are the typical designations of stainless steels according to the AISI (American Iron and Steel Institute) standard.

It will be appreciated that the material of the device or apparatus for vaporizing a hydrazine solution relates to the material in contact with the hydrazine hydrate solution and not to the material in contact with the heating fluid. Chromium oxides are preferably employed, in the form of a coating on a metal surface.

In order to further illustrate the present invention and the advantages thereof, the following specific example is given, it being understood that same is intended only as illustrative and in nowise limitative.

EXAMPLE

A vessel of 300-1 capacity containing a solution of hydrazine hydrate was fitted with an external 5-m² heat exchanger arranged vertically, with recycle into the upper portion of the vessel. It was also possible to arrange a pump capable of delivering 20 m³/hour with a gauge pressure head of 2 bars between the vessel and the exchanger and an outlet diaphragm, to ensure operation as a forced-circulation boiler.

250 kg/h of steam at 18 bars were condensed in the exchanger. The vessel was provide with a total reflux condenser to remove the energy supplied to the exchanger and with degassing means in order to collect the nitrogen, hydrogen and ammonia originating from the decomposition of hydrazine, and thus to measure this decomposition.

The entire apparatus was constructed of steels and exchangers fabricated from different materials, each of which was assessed.

To test each material, the vessel was filled with 50 kg of hydrazine hydrate ($N_2H_4 \cdot H_2O$) diluted in 250 kg of water, and 18-bar of steam were then injected to operate the exchanger as a boiler (250 kg/hour were condensed). The amount of hydrazine remaining in the vessel was measured after one hour. This value was correlated by measuring the degassing. The pressure in the vessel was 9 bars gauge and the temperature 180° C.

(a) When Operating as a Thermosiphon

If an exchanger made of 316 stainless steel was employed, 45 kg of hydrazine hydrate remained after one hour; 47 kg thereof remained in the event of steel and 48.5 kg in the case of titanium.

(b) When Operating Using the Pump

When using a 316 stainless steel exchanger, 47.5 kg of hydrazine hydrate remained after one hour.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a concentrated solution of hydrazine hydrate comprising (a) hydrolyzing an azine or a hydrazone into a solution of hydrazine hydrate in a distillation column (b) introducing a stream of hydrazine hydrate from said distillation column into an external loop to the distillation column, (c) vaporizing hydrazine hydrate in said external loop, without concomitant decomposition by heating said solution introduced into said loop at a temperature of between 130° C. and 220° C. in the loop while maintaining said hydrazine hydrate in the liquid phase and then decompressing the heated solution to volatilize at least a portion of said heated hydrazine hydrate, (d) separating said vaporized hydrazine hydrate from remaining hydrazine hydrate and (e) recycling said remaining hydrazine hydrate to said distillation column.

2. The process as defined by claim 1, wherein the amount of hydrazine hydrate solution vaporized during the step of heating thereof is less than 5% of said solution of hydrazine hydrate heated.

3. The process as defined by claim 1, wherein said stream of hydrazine hydrate from said distillation column is pumped to a pressure of 0.5 to 10 bars higher than in said column.

4. The process as defined by claim 1, said solution of hydrazine hydrate comprising an aqueous solution.

5. The process as defined by claim 1, said solution of hydrazine hydrate further comprising an azine, a hydrazone or a ketone, or mixture thereof.

6. The process as defined by claim 1, comprising heating said solution of hydrazine hydrate in a heat-exchanger provided along said loop.

7. The process as defined by claim 1, the heat-exchanging surfaces of said heat-exchanger comprising titanium, chromium oxide, aluminum, steel, stainless steel, nickel or alloy thereof, or zirconium.

8. The process as defined by claim 1, the heat-exchanging surfaces of said heat-exchanger comprising titanium or chromium oxide.

9. A process for the production of a concentrated solution of hydrazine hydrate comprising (a) hydrolyzing an azine or a hydrazone into a solution of hydrazine hydrate in a distillation column, (b) introducing a stream of hydrazine hydrate from said distillation column into an external loop to the distillation column, (c) vaporizing hydrazine hydrate in said external loop, without concomitant decomposition by heating said solution introduced into said loop at a temperature of between 130° C. and 220° C. in the loop while maintaining said hydrazine hydrate in the liquid phase and then decompressing the heated solution to volatilize at least a portion of said heated hydrazine hydrate, (d) recycling the volatilized portion of said heated solution and remaining solution to said distillation column and (e) removing concentrated hydrazine hydrate from said distillation column.

10. The process as defined by claim 9, wherein the amount of hydrazine hydrate solution vaporized during the step (a) of heating thereof is less than 5% of said solution of hydrazine hydrate heated.

11. The process as defined by claim 9, wherein said decompressing includes lowering the pressure of said heated solution 0.5 to 10 bars.

12. The process as defined by claim 9, said solution of hydrazine hydrate comprising an aqueous solution.

13. The process as defined by claim 9, said solution of hydrazine hydrate further comprising an azine, a hydrazone or a ketone, or mixture thereof.

14. The process as defined by claim 9, comprising heating said solution of hydrazine hydrate in a heat-exchanger provided along said loop.

15. The process as defined by claim 9, the heat-exchanging surfaces of said heat-exchanger comprising titanium, chromium oxide, aluminum, steel, stainless steel, nickel or alloy thereof, or zirconium.

16. The process as defined by claim 9, the heat-exchanging surfaces of said heat-exchanger comprising titanium or chromium oxide.

* * * * *